US011087518B2

(12) United States Patent
Ofek et al.

(10) Patent No.: US 11,087,518 B2
(45) Date of Patent: *Aug. 10, 2021

(54) SECOND-PERSON AVATARS

(71) Applicant: MICROSOFT TECHNOLOGY LICENSING, LLC, Redmond, WA (US)

(72) Inventors: Eyal Ofek, Redmond, WA (US); Blaise H. Aguera y Arcas, Seattle, WA (US); Avi Bar-Zeev, Redmond, WA (US); Gur Kimchi, Bellevue, WA (US); Jason Szabo, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 941 days.

This patent is subject to a terminal disclaimer.

(21) Appl. No.: 15/228,936

(22) Filed: Aug. 4, 2016

(65) Prior Publication Data

US 2016/0342432 A1 Nov. 24, 2016

Related U.S. Application Data

(63) Continuation of application No. 12/392,538, filed on Feb. 25, 2009, now Pat. No. 9,436,276.

(51) Int. Cl.
*G06T 13/40* (2011.01)
*G06F 9/451* (2018.01)
(Continued)

(52) U.S. Cl.
CPC ............ *G06T 13/40* (2013.01); *A63F 13/537* (2014.09); *A63F 13/69* (2014.09); *A63F 13/79* (2014.09); *G02B 27/01* (2013.01); *G02B 27/0101* (2013.01); *G06F 3/011* (2013.01);
*G06F 3/167* (2013.01); *G06F 9/453* (2018.02); *G06T 19/006* (2013.01); *A63F 2300/301* (2013.01); *A63F 2300/305* (2013.01);
(Continued)

(58) Field of Classification Search
USPC .......................................................... 715/706
See application file for complete search history.

(56) References Cited

U.S. PATENT DOCUMENTS 5,184,295 A * 2/1993 Mann ................. A63B 24/0003
473/221
5,249,967 A * 10/1993 O'Leary ............ A63B 24/0003
434/247

(Continued)

*Primary Examiner* — Henry Orr
(74) *Attorney, Agent, or Firm* — Shook, Hardy & Bacon, L.L.P.

(57) ABSTRACT

The claimed subject matter relates to an architecture that can provide for a second-person avatar. The second-person avatar can rely upon a second-person-based perspective such that the avatar is displayed to appear to encompass all or portions of a target user. Accordingly, actions or a configuration of the avatar can serve as a model or demonstration for the user in order to aid the user in accomplishing a particular task. Updates to avatar activity or configuration can be provided by a dynamic virtual handbook. The virtual handbook can be constructed based upon a set of instruction associated with accomplishing the desired task and further based upon features or aspects of the user as well as those of the local environment.

20 Claims, 11 Drawing Sheets

(51) Int. Cl.
   *G06T 19/00*   (2011.01)
   *A63F 13/537*   (2014.01)
   *A63F 13/79*   (2014.01)
   *A63F 13/69*   (2014.01)
   *G02B 27/01*   (2006.01)
   *G06F 3/01*   (2006.01)
   *G06F 3/16*   (2006.01)

(52) U.S. Cl.
   CPC .................. *A63F 2300/8082* (2013.01);
         *G02B 2027/014* (2013.01); *G02B 2027/0138*
         (2013.01)

(56) References Cited

U.S. PATENT DOCUMENTS

| | | | | |
|---|---|---|---|---|
| 6,847,336 | B1* | 1/2005 | Lemelson | A61B 1/00048 345/8 |
| 2002/0087263 | A1* | 7/2002 | Wiener | G01C 21/3608 701/431 |
| 2003/0077556 | A1* | 4/2003 | French | A61B 5/1113 434/258 |
| 2003/0120183 | A1* | 6/2003 | Simmons | G06F 3/011 600/595 |
| 2004/0002634 | A1* | 1/2004 | Nihtila | A61B 5/0002 600/300 |
| 2004/0183775 | A1 | 9/2004 | Bell | |
| 2005/0179202 | A1 | 8/2005 | French et al. | |
| 2006/0094523 | A1* | 5/2006 | Hall | A63B 69/3623 473/266 |
| 2006/0262120 | A1* | 11/2006 | Rosenberg | G06F 3/011 345/473 |
| 2007/0172155 | A1* | 7/2007 | Guckenberger | G06F 16/583 382/305 |
| 2007/0282564 | A1* | 12/2007 | Sprague | G03B 21/14 702/141 |
| 2008/0020814 | A1* | 1/2008 | Kernene | H04N 21/235 463/10 |
| 2008/0208749 | A1* | 8/2008 | Wallace | G06Q 20/40 705/44 |
| 2008/0297589 | A1* | 12/2008 | Kurtz | H04N 7/147 348/14.16 |
| 2009/0027337 | A1* | 1/2009 | Hildreth | G06F 3/011 345/158 |
| 2009/0106672 | A1* | 4/2009 | Burstrom | A63F 13/12 715/757 |
| 2009/0181737 | A1* | 7/2009 | Argentar | A63F 13/02 463/2 |
| 2009/0238378 | A1* | 9/2009 | Kikinis | H04N 13/398 381/92 |
| 2009/0262137 | A1* | 10/2009 | Walker | H04H 60/04 345/629 |
| 2009/0325701 | A1* | 12/2009 | Andres Del Valle | A63F 13/12 463/36 |
| 2010/0153869 | A1* | 6/2010 | Dawson | H04L 67/38 715/764 |
| 2010/0218094 | A1 | 8/2010 | Ofek et al. | |

* cited by examiner

SECOND-PERSON AVATARS

CROSS-REFERENCE TO RELATED APPLICATIONS

This application is a continuation of U.S. application Ser. No. 12/392,538, filed Feb. 25, 2009, entitled "Second-Person Avatars,", which is herein incorporated by reference in its entirety.

BACKGROUND

In the domain of literature, authors leverage a variety of perspective techniques to better convey a narrative. For example, first-person perspective relates to a view of the world from the perspective of a single character. Thus, first-person perspective allows the reader to experience events through the perceptions of another by proxy. First-person devices are often associated with biographies and are characterized by pronouns such as "I" or "we." Third-person perspective is the most common type of perspective device and is often characterized by omniscient perspectives with each character referred to as a distinct entity from the point-of-view of the reader, often exemplified by pronouns "he" or "she." By far, the rarest perspective type is that of second-person, wherein events or behaviors of another are attributed to the reader. Second-person literature is most commonly utilized in terms of choose-your-own-adventure books or how-to books, and is typified by narratives that discuss "you," rather than "I," "we,", "he," or "she."

As with literature, perspective devices can be important to other domains as well. For example, perspective devices can be thoughtfully applied to immersive or virtual environments yet, conventionally, this is not the case. Rather, consider avatars of today's immersive or virtual environments. Avatars in these cases are generally constructed to represent a friend or assistant who can interact with the user or an environment of the user as a distinct entity vis-à-vis the perspective of that user. Thus, today's avatars are arbitrarily discussed or implemented as distinct third-person entities, and once implemented in this perspective type, as with literature, it becomes erroneous or unnatural to switch to another perspective type. Thus today's immersive or virtual environments do not adequately leverage other types of perspective.

SUMMARY

The following presents a simplified summary of the claimed subject matter in order to provide a basic understanding of some aspects of the claimed subject matter. This summary is not an extensive overview of the claimed subject matter. It is intended to neither identify key or critical elements of the claimed subject matter nor delineate the scope of the claimed subject matter. Its sole purpose is to present some concepts of the claimed subject matter in a simplified form as a prelude to the more detailed description that is presented later.

The subject matter disclosed and claimed herein, in one or more aspects thereof, comprises an architecture that can provide a second-person avatar to facilitate manual instruction. In particular, as with its literary counterpart, second-person avatars can be especially helpful with instructive or how-to guidance. In accordance therewith and to other related ends, the architecture can include an interface with a projector that displays at least a portion of the second-person avatar in a volume of space that substantially encapsulates at least a portion of a target user. In addition, the architecture can include an illustration component that can receive a dynamic virtual handbook that includes a set of avatar actions as well as additional content such as, e.g., instructions for spotlighting objects, outputting verbal instructions or the like.

The avatar actions can illustrate associated user actions that are suggested for accomplishing a task in a local environment context. Accordingly, the user-interface can update the avatar based upon the virtual handbook. Thus, when the activity of the second-person avatar is emulated by the user or the user otherwise follows instructions included in the virtual handbook, then the task can be accomplished more proficiently.

Moreover, the architecture can identify deviations between a user action or configuration and that for the second-person avatar based upon a divergence that is greater than or equal to an error threshold or tolerance, which can be based upon the particular task desired to be accomplished by the user. When the deviation occurs, the user can be alerted, by way of a verbal statement, by highlighting the non-overlapping portions of the avatar in a different color, or in some other suitable manner. Likewise, the architecture can identify pertinent objects in the local environment such as the proper instrument to use, the proper application or target, or the next step in accomplishing that task.

In addition, the architecture can also facilitate construction of the virtual handbook based upon a set of instructions that relate to accomplishing the task desired by the user. The set of instructions can be acquired from a user manual, an instruction manual data store, or from live or recorded demonstrations or commands, potentially from a remote expert. The instructions can be translated further based upon features of the user or an associated user profile. For example, the translation to the virtual handbook can be based upon the user's physique, handedness, fitness, skill set, or the like.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
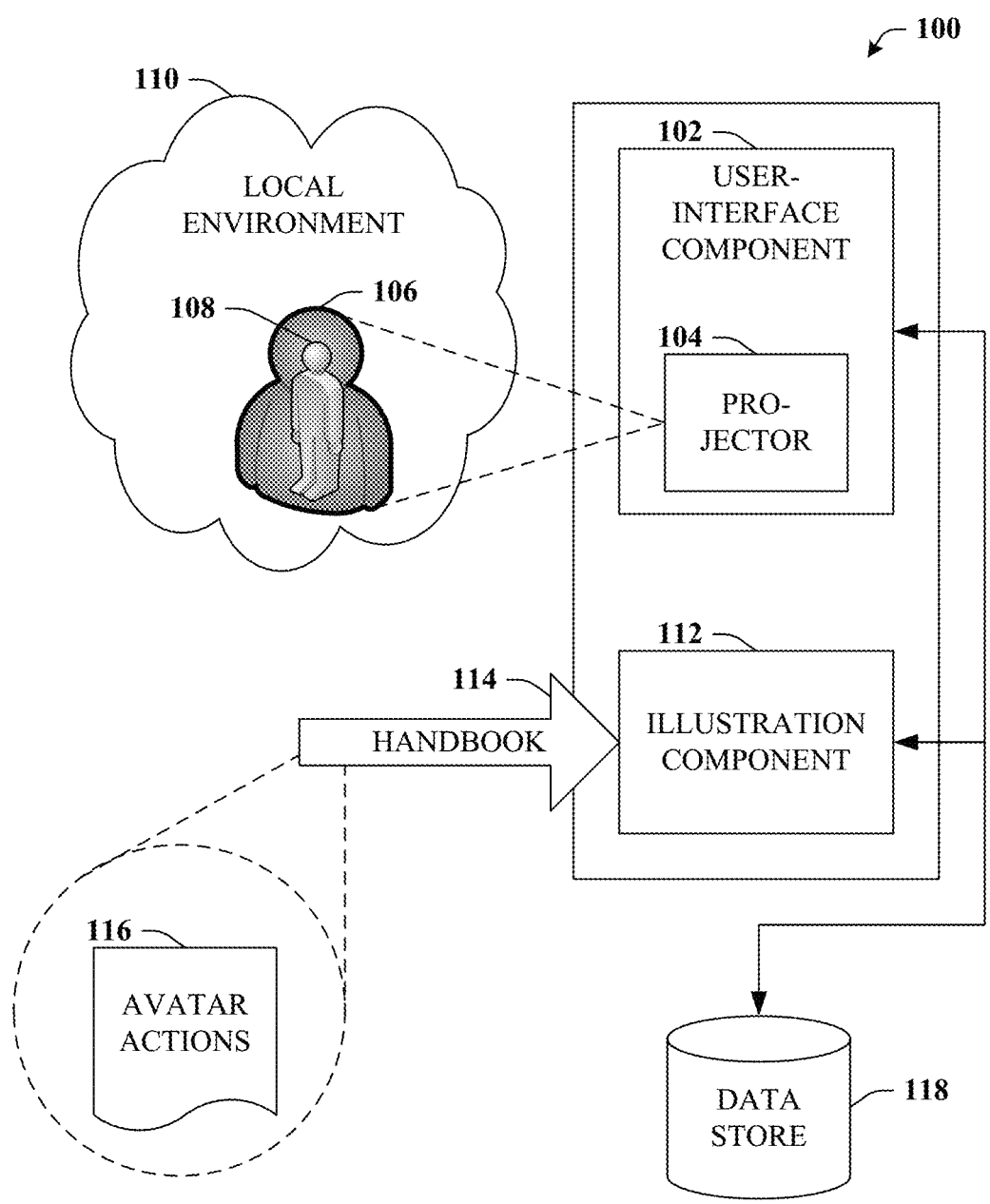
FIG. 1 illustrates a block diagram of a computer-implemented system that can provide a second-person avatar in order to facilitate manual instruction.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system," or the like can, but need not, refer to a computer-related entity, either hardware, a combination of hardware and software, software, or software in execution. For example, a component might be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." Therefore, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms "infer" or "inference" generally refer to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, with reference initially to FIG. 1, computer-implemented system 100 that can provide a second-person avatar in order to facilitate manual instruction is depicted. Generally, system 100 can include user-interface component 102, which is intended to include or manage all or portions of 110 operations associated with user 108 and/or otherwise described herein. User-interface component 102 can include projector 104 that can display at least a portion of second-person avatar 106 in a volume of physical space that substantially encapsulates at least a portion of target user 108 or that appears to encapsulate the portion of target user 108. In other words, projector 104 intentionally projects or displays avatar 106 on or over portions of user 108, thus facilitating a second-person perspective or experience in connection with avatar 106. Such an experience can operate as an instructional guide for illustrating position, configuration, or activity of user 108.

In addition, system 100 can further include illustration component 112 that can receive dynamic virtual handbook 114. Virtual handbook 114 can include set 116 of avatar actions, the members of which are referred to herein either collectively or individually as avatar action(s) 116. Avatar actions 116 refer to changes or updates to avatar 106 (e.g., visible or demonstrative actions performed by the avatar) that when mimicked or emulated by user 108 can facilitate accomplishing a task or endeavor user 108 desires to perform. More particularly, avatar actions 116 thus illustrate associated user actions (e.g., movements that track avatar 106 while avatar 106 performs avatar actions 116) that are suggested or recommended for accomplishing the task given the features, context, or constraints of the user's 106 local environment 110.

Moreover, based upon avatar actions 116 included in virtual handbook 114, user-interface component 102 can facilitate updates to avatar 106, e.g., by instructing projector 104 to change the display of avatar 106 in order to effectuate avatar actions 116 included in virtual handbook 114. Accordingly, it is readily apparent that the claimed subject matter can provide acute detail in connection with performing the task, even very complex ones or those in which user 108 is not familiar. Additionally, such can be achieved in a manner that can be much more intuitive than, say, interpreting textual instructions or static images. Moreover, the above can be accomplished in a manner that is readily observable and comprehensible by way of the demonstrative actions of avatar 106 that operates in the context of local environment 110, potentially in connection with existing features or objects therein rather than based upon a hypothetical environment or a disparate environment employed for instructional videos.

By way of illustration, the task sought to be accomplished by user 108, which can be simplified or more efficiently accomplished by way of second-person avatar 106, can relate to, e.g., learning to play a musical instrument, or learning dance steps, repairing a household appliance, exercise or activity, where to stand for the best on a tour or hike for the best view to name but a few examples. While numerous other examples are contemplated to exist, one or more of the above-mentioned examples will be used herein to demonstrate aspects, features, or capabilities of the claimed subject matter. Moreover, it should be appreciated that recordings of user 108 along with second-person avatar 106 can be captured and subsequently displayed to user 108, say for review. Thus, user 108 can observe when and where his or her actions deviate from avatar 106, and make suitable adjustments or notations.

In addition, it should be understood that system 100 can also include or be operatively connected to data store 118. Data store 118 is intended to be a repository of all or portions of data, data sets, or information described herein or otherwise suitable for use with the claimed subject matter. Data store 118 can be centralized, either remotely or locally cached, or distributed, potentially across multiple devices and/or schemas. Furthermore, data store 118 can be embodied as substantially any type of memory, including but not limited to volatile or non-volatile, sequential access, structured access, or random access and so on. It should be understood that all or portions of data store 118 can be included in system 100, or can reside in part or entirely remotely from system 100.

Figure 2:
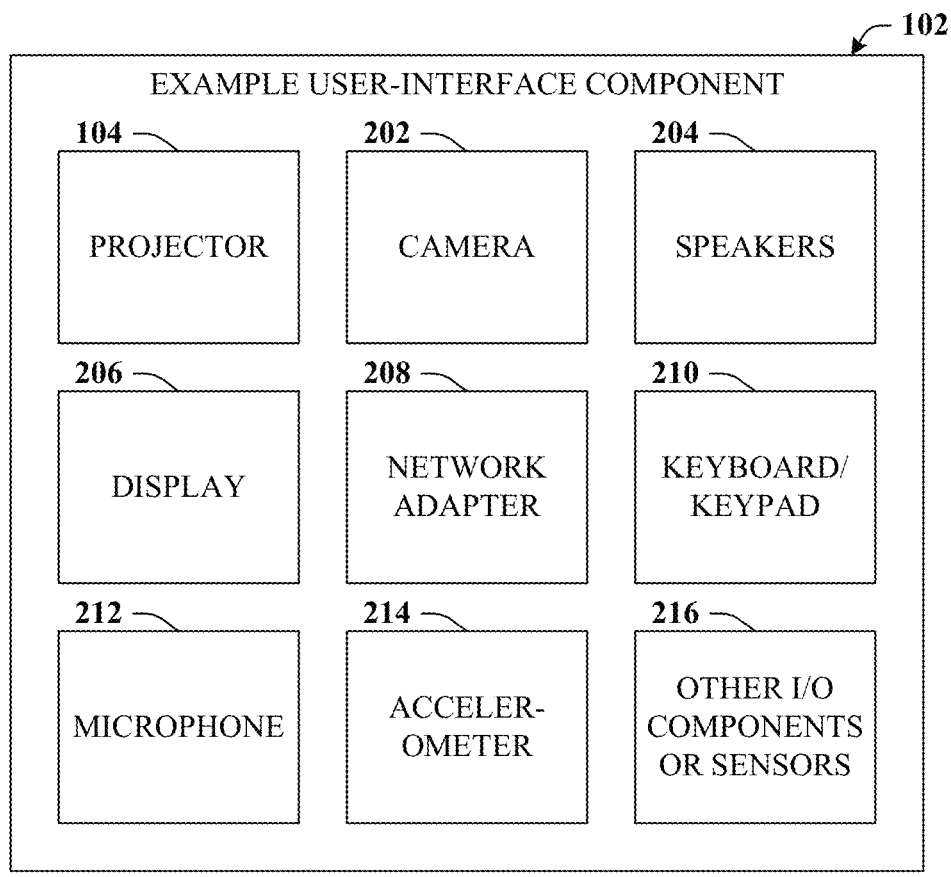
FIG. 2 provides additional example features of user-interface component 102.

While still referring to FIG. 1, but turning now also to FIG. 2, additional example features of user-interface component 102 are described. As mentioned supra, user-interface component 102 can include projector 104. Projector 104 can be one or more of a laser-based projector, a light emitting diode (LED) projector or another type of projector, including a virtual retinal display (VRD)-based projector and micro projectors or other handheld or mobile projectors. User-interface component 102 can also include one or more camera 202, e.g., to monitor movements, behaviors, features, or context in connection with user 108, avatar 106, and/or local environment 110 as well as one or more speaker 204 to, e.g., present audio portions of virtual handbook 114 or other audio outputs.

Moreover, user-interface component 102 can include one or more display 206, which can be, e.g., a monitor, a touch-screen, a multi-touch surface, a head up display (HUD), or a VRD. In one or more aspects of the claimed subject matter, second-person avatar 106 is visible when viewed through a HUD or VRD. Accordingly, avatar 106 might or might not be visible to the naked eye, which can be dependent upon the implementation details or equipment employed by user 108. Furthermore, user-interface component 102 can include one or more network adapter 208 in order to provide network accessibility. Although not strictly necessary, network adapter 208 will typically relate to a wireless network.

In addition, one or more keyboard or keypad 210 (e.g., standard keys or buttons as well as soft or virtual keys or buttons) can be included in user-interface component 102 as can one or more microphone 212 in order to, e.g., facilitate text, function, or voice input, respectively, from user 108. User-interface component 102 can also include one or more accelerometer 214 to monitor motive or mechanical accelerations of all or portions of user 108. Appreciably, a variety of other I/O components or sensors 216 can be included in user-interface component 102. Such included elements can be, e.g., biometric sensors (e.g., heart rate, blood pressure . . . ), gaze-tracking sensors, or substantially any other suitable I/O component or sensor.

It should be further appreciated that all or portions of the above-mentioned elements (e.g., elements 104, 202-216) can be included in user-interface component 102 or operatively or communicatively coupled to user-interface component 102. Thus, it is readily apparent that all or portions of user-interface component 102 can be included in a headset or another wearable unit. Additionally or alternatively, all or portions of user-interface component 102 can be included in stationary or mobile device such as, e.g., a handheld or portable device or unit or embedded in a "smart" room.

Figure 3:
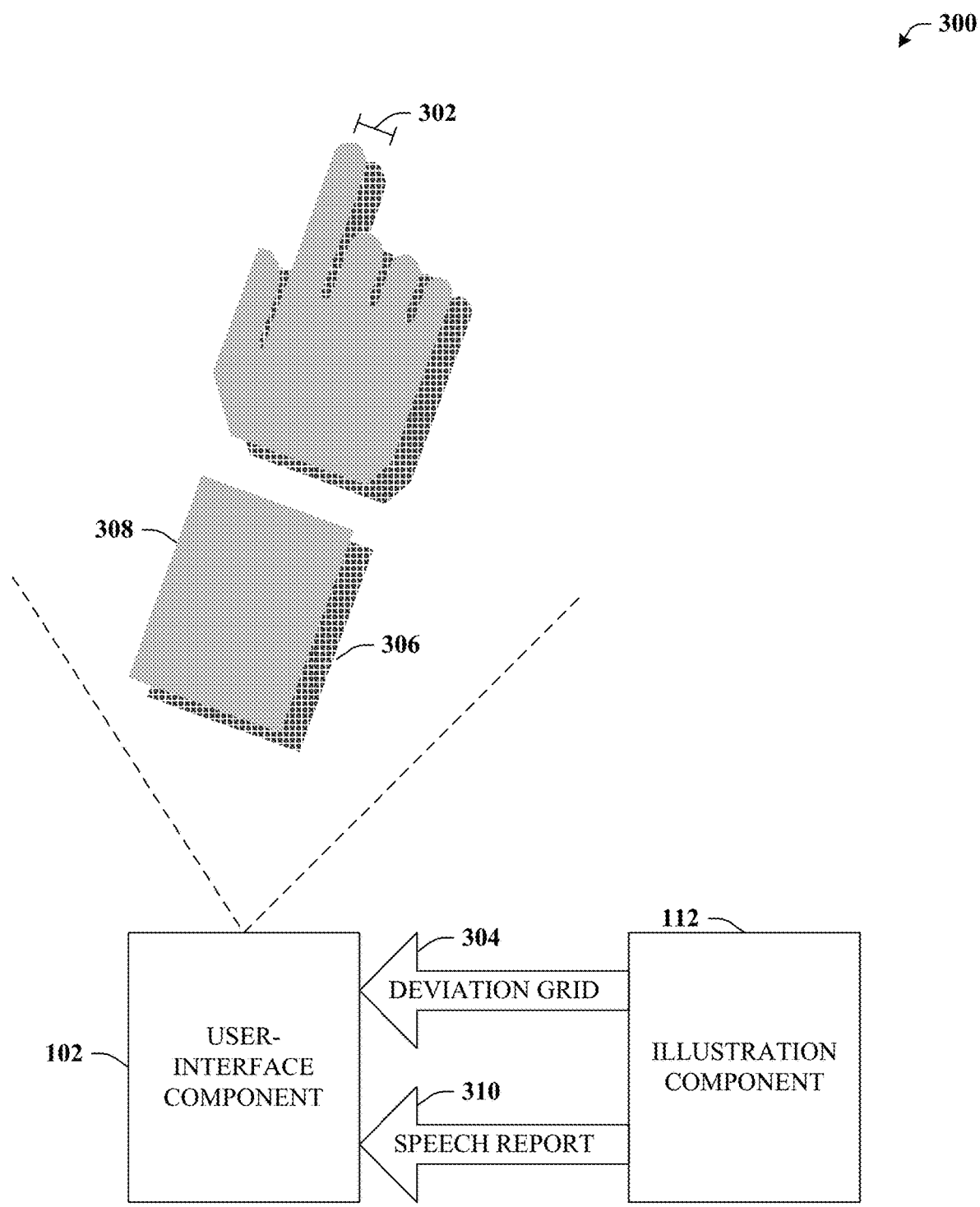
FIG. 3 depicts a block diagram of a system that can identify a deviation between an operator and a second-person avatar.

With reference now to FIG. 3, system 300 that can identify a deviation between an operator and a second-person avatar is illustrated. For example, consider the case in which user 108 desires to learn to play a particular piano concerto. As user 108 sits before a piano (not shown), avatar 106 can be displayed to encompass the hands and lower arms of user 108 to indicate the proper or suggested configuration. Thus, user-interface component 102 can display relevant portions of avatar 106, and can also identify the position of the corresponding features (e.g., the hands) of user 108, for instance by way of camera 202.

In one or more aspects of the claimed subject matter, illustration component 112 can identify a deviation when a user action or configuration deviates from avatar action 116 by or beyond an acceptable error threshold 302. When the deviation occurs, illustration component 112 can construct deviation grid 304 that can identify section 306 of avatar 106 that deviates from an associated portion 308 of user 108. In other words, deviation grid 304 can identify the volume or region 306 that is presently not encompassing associated portions 308 of user 108, for example, because user 108 is not correctly aligned or has not performed the appropriate action or activity. In one or more aspects, user-interface component 102 can update a color of section 306 based upon deviation grid 304. Thus, section 306 can be colored, e.g., red or some other color or scheme to alert user 108 of the deviation, while the other portions of avatar 106 appear in a normal color or scheme.

Error threshold 302 can be based upon a predefined or default value. Additionally or alternatively, error threshold 302 can be set by user 108 or dynamically or intelligently set based upon the particular application. For example, repairing a pocket watch can require much greater precision (and therefore be afforded a smaller error threshold 302) than, say, learning to foxtrot. Likewise, regardless of the task or activity of the user, the speed of second-person avatar 106 can be set or adjusted, either by user 108 or based upon an inference or intelligent determination. For instance, avatar actions 116 included in virtual handbook 114 can be sped up or slowed down according to a user's 108 competence or comfort level or an inference thereof.

In one or more aspects of the claimed subject matter, illustration component 112 can construct speech report 310 that can explain the deviation or a corrective process thereof in verbal form. User-interface component 102 can output speech report 310 by way of, e.g., speakers 204. Thus, based upon the provided depiction, speech report 310 can verbalize, "Please move your right hand to the right to be correctly configured." Of course, the above is merely one example, and it should be appreciated that speech report 310 can be configured to provide precise terms or units of measure, order, speed, or even refer to particular objects within environment 110, which is further discussed in connection with FIG. 4.

Figure 4:
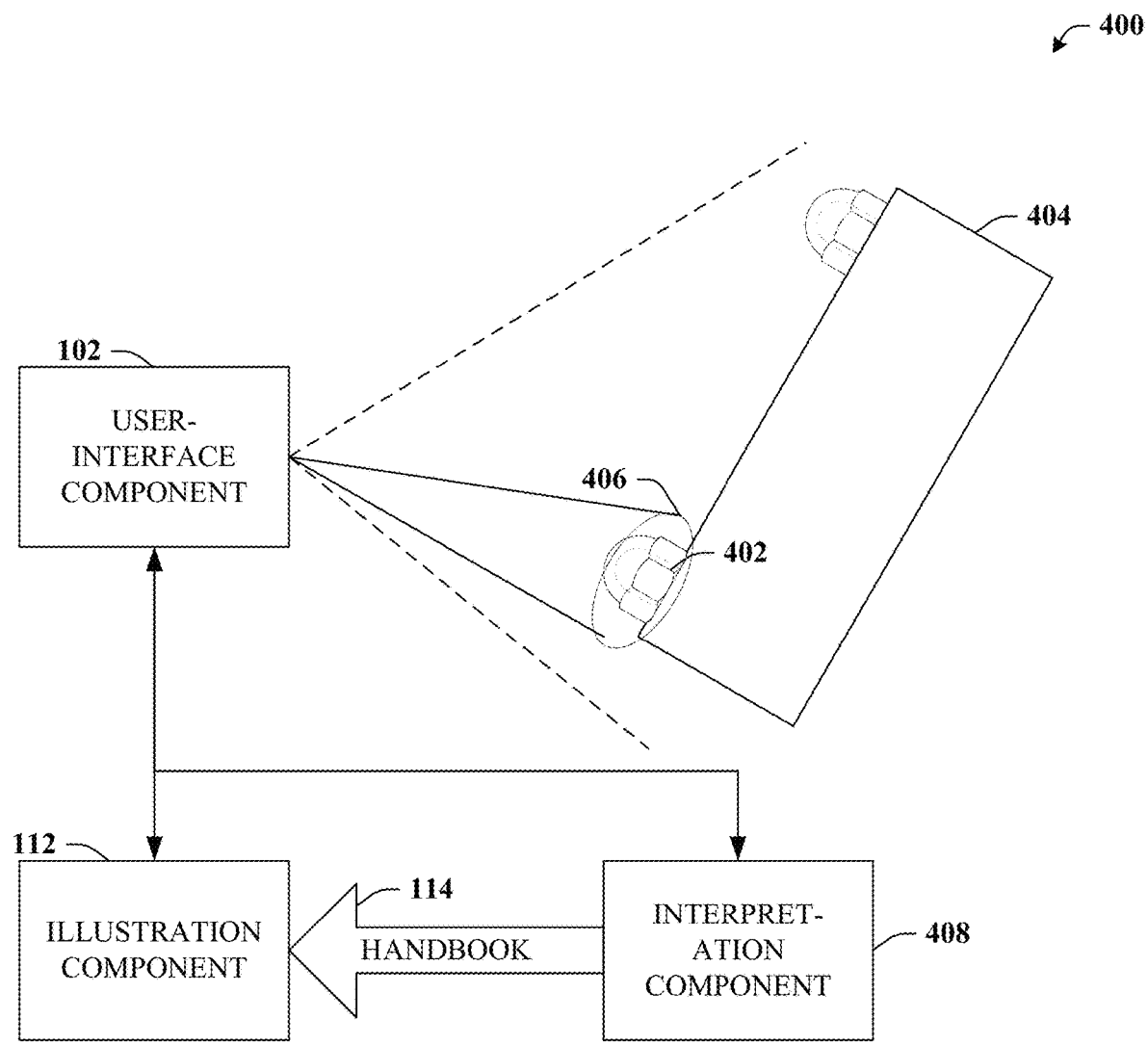
FIG. 4 illustrates a block diagram of a system that can highlight objects in the local environment that relate to accomplishing the task.

Turning now to FIG. 4, system 400 that can highlight objects in the local environment that relate to accomplishing the task is provided. For instance, drawing from the previously introduced scenario in which user 108 desires to repair appliance 404. In addition to describing avatar actions 116, virtual handbook 114 can identify a feature or object 402 included in local environment 110. For example, suppose the first step to repairing appliance 404 is to remove a particular nut 402. This nut 402 can be identified by interpretation component 408 (further detailed in connection with FIG. 5) and included in virtual handbook 114. Thus, when interpreting handbook 114, illustration component 112 can instruct that nut 402 be visually highlighted 406, which can be effectuated by, e.g., projector 104 of user-interface component 102. Appreciably, in one or more aspects objects highlighted 406 can be accomplished by way of the "smart" room concept introduced above. For example, the smart room can include a rotating mirror, typically mounted on the ceiling that can reflect or direct light to any point in the room.

Appreciably, the precise shape and area of feature or object 402 (in this case a nut) can be highlighted, and color coding can be employed as well. Thus, multiple nuts can be highlighted in different colors or according to another ordering scheme to identify the order in which each should be loosened or removed. Similarly, user-interface component 102 can highlight recommended equipment or tools to use for accomplishing the task based upon, for instance, the items included in a nearby toolbox (e.g., the proper size socket for an associated socket wrench or a determination of standard versus deep well, inch versus metric and so forth). Additional features or aspects are further discussed infra with reference to FIG. 5.

Figure 5:
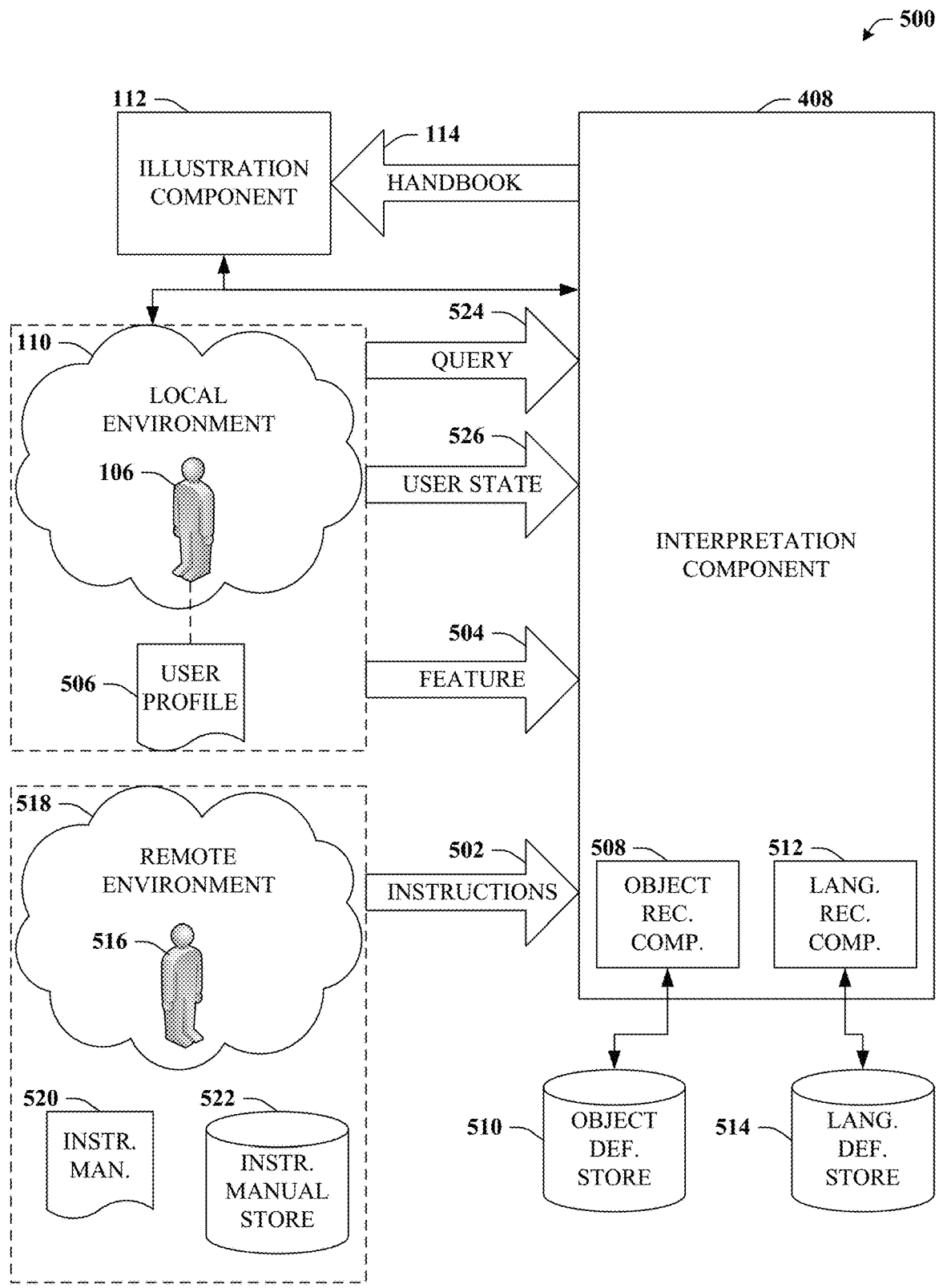
FIG. 5 is a block diagram of a system that can construct a dynamic virtual handbook and provide related addition features.

Turning now to FIG. 5, system 500 that can construct a dynamic virtual handbook and provide related addition features is illustrated. In particular, system 500 can include interpretation component 408, which was introduced supra in connection with FIG. 4. It should be understood that interpretation component 408 can be included in or operatively coupled to illustration component 112. In one or more aspects of the claimed subject matter, interpretation component 408 can receive set 502 of instructions (hereinafter referred to either individually or collectively as instruction(s) 502) that relate to accomplishing the task desired by user 108. Interpretation component 408 can then translate instructions 502 into suitable avatar actions 116 that constitute virtual handbook 114.

By way of illustration, interpretation component 408 can translate an instruction 502 based upon feature 504. In one or more aspects, feature 504 can relate to or be associated with target user 108 or a corresponding user profile 506. As a few brief examples, feature 504 can relate to a size or dimension of user 108 or a handedness of user 106. In other words, when constructing virtual handbook 114 from instructions 502, size, shape, preferences, aptitudes and so forth of user 108 can be accounted for, any of which can affect the appearance or actions performed by second-person avatar 106 or in connection with other aspects of virtual handbook 114. Thus, if user 108 has a small frame, second-person avatar 106 can be appropriately sized. Or, if user 108 is left-handed, avatar 106 can reach for and utilize, say, a wrench with the left hand rather than the right hand. As can be readily appreciated, many other features 504 of user 108 can be employed for customizing virtual handbook 114 beyond the examples provided herein. For instance, principles physics can be employed and can be used in connection with a history or analysis of gestures, behaviors, or conditioning of user 108 for a particular task such that for one user avatar 106 might bend over to turn a screw, while for a second user avatar 106 might first kneel in a usual manner or one that facilitates support or comfort before attending to the screw. Appreciably, cameras 202 can be employed to monitor and analyze both gestural and behavior patterns of any number of users 108. These patterns can be stored and later recalled when customizing virtual handbook 114.

In one or more aspects of the claimed subject matter, feature 104 can be an object associated with local environment 110. For instance, in the above example, the mere fact that a wrench (or the particular type) is available in local environment 110 can affect how virtual handbook 114 is constructed or updated. Thus, interpretation component 408 can include or be operatively coupled to object recognition component 508. Object recognition component 508 can include or be operatively coupled to object definitions data store 510, and can be employed to monitor, examine, or identify objects/features 504 within local environment 110, generally based upon camera 202 included in user-interface component 102. Object recognition component 508 can also monitor, example, or identify objects included in instructions 502, such as diagrams, a legend, or the like from an instruction manual. Based upon such identification, interpretation component 408 can be apprised of the composition, state, or other aspects of local environment 110, and use this information in connection with instructions 502 to build or update virtual handbook 114. Thus, second-person avatar 106 can perform actions that are particularly well-suited to efficiently and properly accomplishing the desired task.

Similarly, interpretation component 408 can also include or be operatively coupled to language recognition component 512. Language recognition component 512 can include or be operatively coupled to language definitions data store 514 or various types of dictionaries, potentially dictionaries that are domain specific such as optical character recognition (OCR), architectural, engineering, language translation, and so on. Hence, in addition to identifying text, language recognition component 512 can also translate languages. Thus, instructions 502 that are in a foreign language can be translated to a native language of user 106. More particularly, interpretation component 408 can leverage language recognition component 512 in order to aid in translating instructions 502 into virtual handbook 114 based upon textual or verbal inputs.

The instructions 502 themselves can originate from an instruction manual 520, which can be in possession of user 108 or otherwise physically located in local environment 110, or acquired online (e.g., by way of network adapter 208. Appreciably, instruction manuals can be acquired from instruction manual data store 522. In accordance therewith, consider once more the scenario in which user 108 desires to repair an appliance. User-interface component 102 can image or scan a local instruction manual 520, or image a model number, serial number, barcode or other product information, then automatically download the suitable repair manual. Regardless, once acquired, the repair manual can represent instructions 502 that are translated into virtual handbook 114.

In one or more aspects of the claimed subject matter, interpretation component 408 can receive instructions 502 from remote party 516. Remote party 516 can be present in remote environment 518, which can be disparate from local environment 110. Remote party 518 can be, e.g., an expert in the field or domain of the desired task. Accordingly, instructions 502 can be a live feed, either text-based, audio-based, video-based, or combinations thereof; or previously recorded. Hence, instructions 502 can be a manual demonstration of accomplishing the task in remote environment 518, potentially by an expert, which interpretation component 408 can translate into virtual handbook 114 for second-person avatar 106 to follow in local environment 110. Moreover, it is further possible for remote party 518 to have a view of local environment 110 in real time, e.g., by way of camera 202, which can include audio from microphone 212. Appreciable, these or other aspects of the claimed subject matter can relate to emergency situations, e.g., where a local individual it not competent to deal with the emergency, yet one who is competent is at a distant location.

In one or more aspect of the claimed subject matter, interpretation component 408 can receive verbal (or another type of) query 524 originating from user 106, examine state 526 of user 106 at the approximate time of query 524, and then update virtual handbook 114 accordingly, based upon query 524 and state 526. For example, user 106 can query, "Is this the correct wire?" In response, interpretation component 408 can review an image from camera 202 to identify which wire of the appliance the user is currently touching in order to make the requested determination vis-à-vis instructions 502. Thus, the associated update to virtual handbook 114 can be a corrective highlight of the proper wire, a slight adjustment to second-person avatar 106, a verbal instruction indicating the current wire is the correct one, or some other suitable modification, any or all of which can be presented by user-interface component 102. In addition, network adapter 208 can facilitate lookup or purchase information for replacement parts, potentially determined automatically, or when so instructed or notified by user 106.

Figure 6:
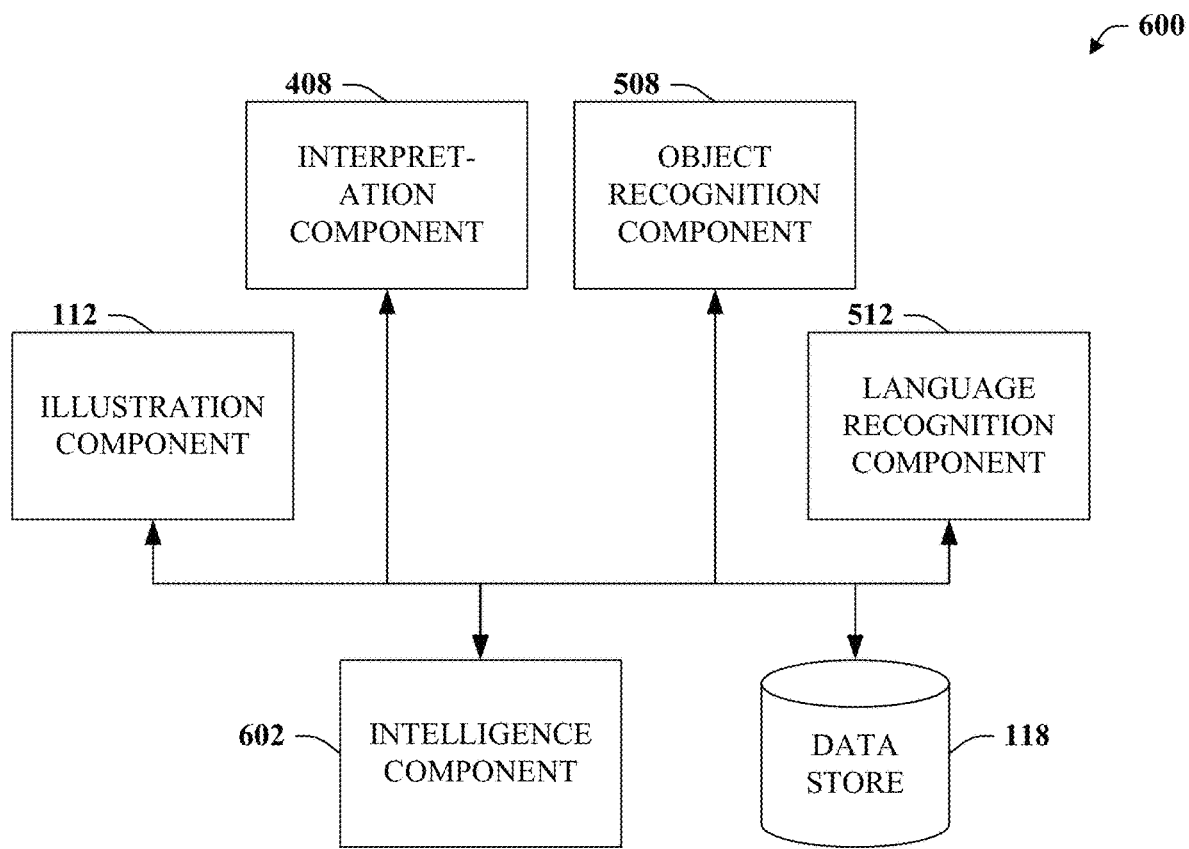
FIG. 6 is a block diagram of a system that can provide for or aid with various inferences or intelligent determinations.

Referring now to FIG. 6, system 600 that can provide for or aid with various inferences or intelligent determinations is depicted. Generally, system 600 can include illustration component 112, interpretation component 408, object recognition component 508, or language recognition component 512 as substantially described herein. In addition to what has been described, the above-mentioned components can make intelligent determinations or inferences. For example, illustration component 112 can intelligently determine or infer error threshold 302 based upon the particular task in which user 108 is interested. Illustration component 112 can further intelligently determine or infer a speed at which second-person avatar 106 performs avatar actions 116. For example, such a determination or inference can be based upon a known user competency, a history of user 108 in connection with the same or a similar task, monitored proficiency such as repeated errors and such, or the like.

Likewise, interpretation component 408 (or object recognition component 508 or language recognition component 512) can intelligently determine or infer various aspects relating to translation of manuals 520, 522 into virtual handbook 114, relating to interpreting verbalizations from remote party 518 or queries 524 from user 108, relating to translating actions of remote party 518 into corresponding avatar actions 116 in local environment 110 or related verbal instructions. Any of the foregoing inferences can potentially be based upon, e.g., Bayesian probabilities or confidence measures or based upon machine learning techniques related to historical analysis, feedback, and/or previous other determinations or inferences.

In addition, system 600 can also include intelligence component 602 that can provide for or aid in various inferences or determinations. In particular, in accordance with or in addition to what has been described supra with respect to intelligent determination or inferences provided by various components described herein. For example, all or portions of illustration component 112, interpretation component 408, object recognition component 508, or language recognition component 512 (as well as other components described herein) can be operatively coupled to intelligence component 602. Additionally or alternatively, all or portions of intelligence component 602 can be included in one or more components described herein. Moreover, intelligence component 602 will typically have access to all or portions of data sets described herein, such as data store 118, which can encompass or include other data sets such as object definition store 510, language definition store 514, instruction manual store 522, and so forth.

Accordingly, in order to provide for or aid in the numerous inferences described herein, intelligence component 602 can examine the entirety or a subset of the data available and can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data.

Such inference can result in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier can be a function that maps an input attribute vector, $x=(x1, x2, x3, x4, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hyper-surface in the space of possible inputs, where the hyper-surface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

Figure 7:
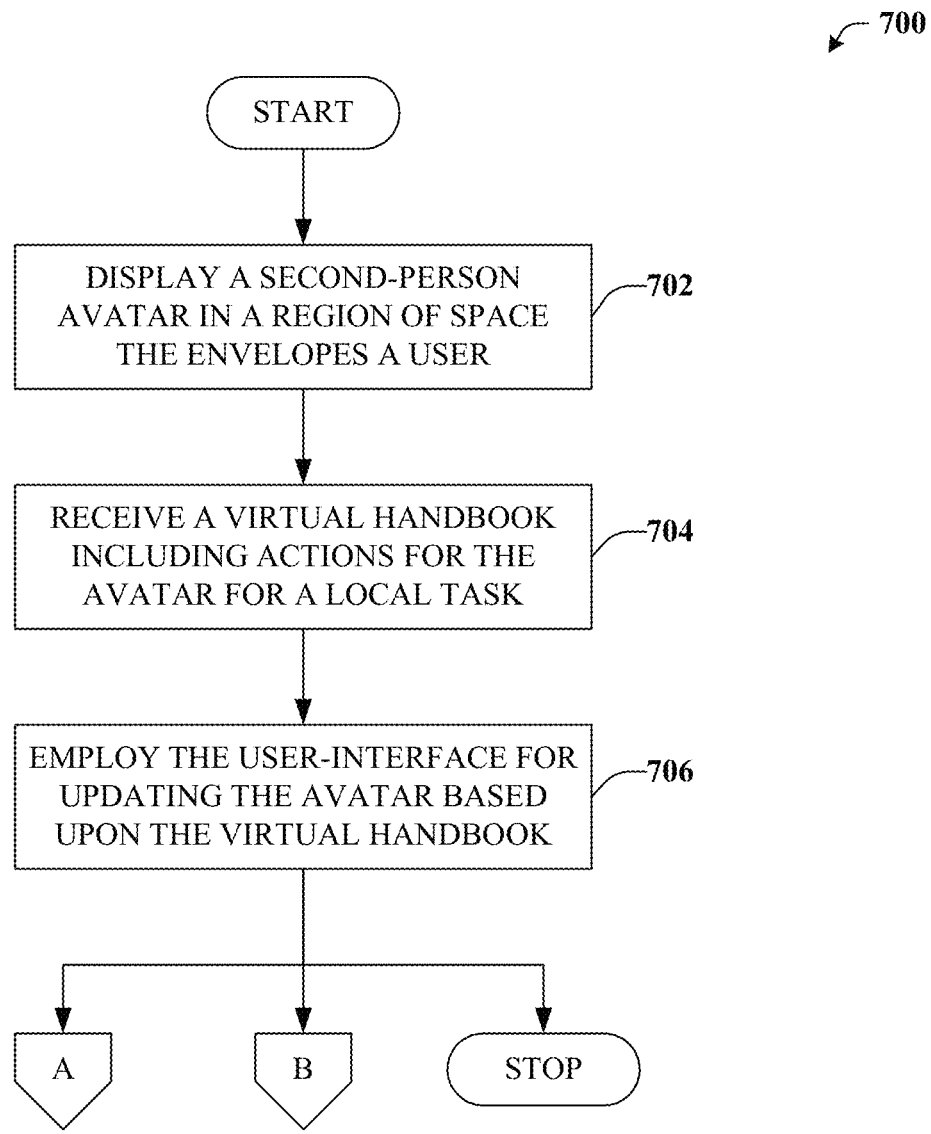
FIG. 7 depicts an exemplary flow chart of procedures that define a method for presenting a second-person avatar and for facilitating manual illustration.
Figure 8:
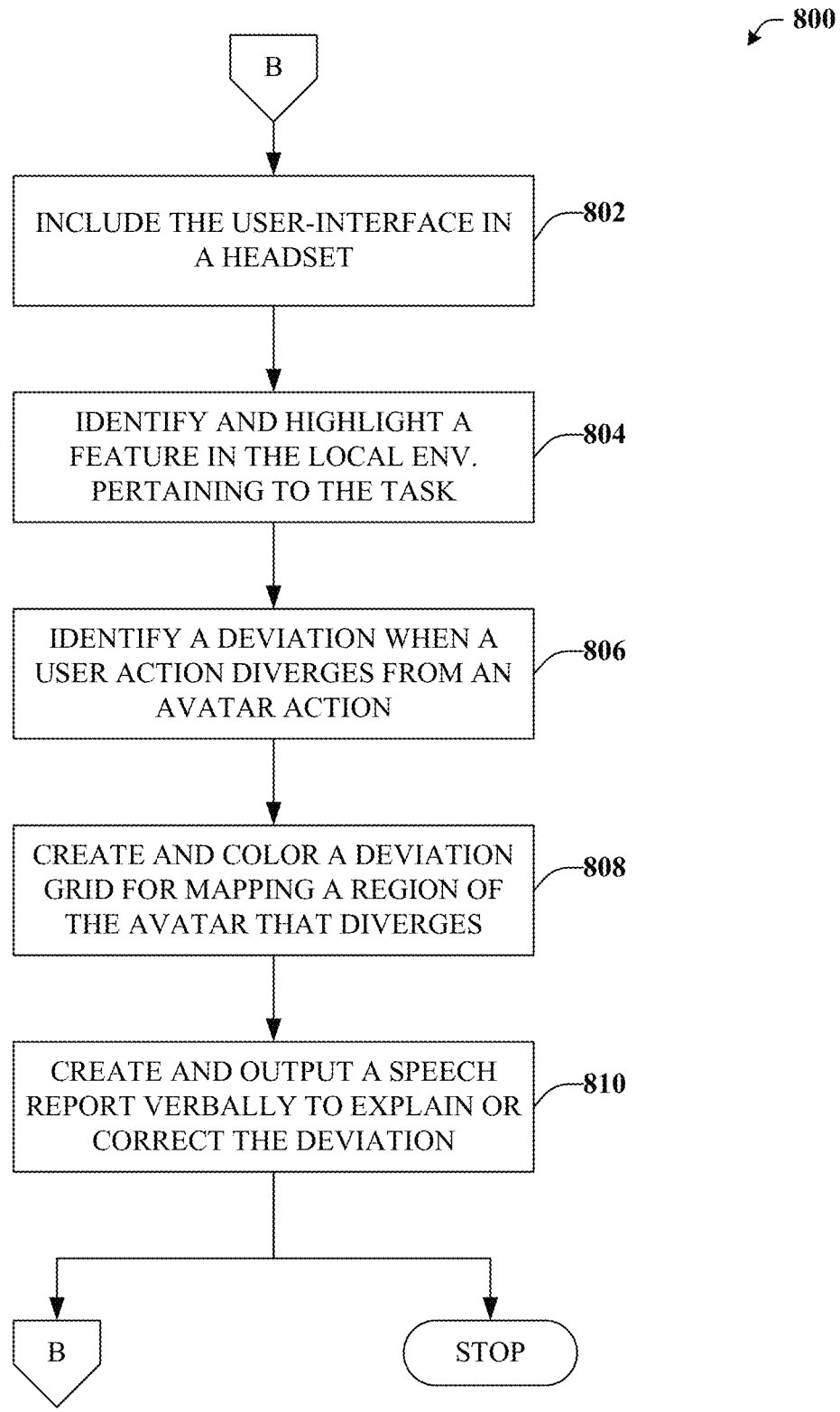
FIG. 8 illustrates an exemplary flow chart of procedures that define a method for providing addition features in connection with presenting a second-person avatar for manual illustration.
Figure 9:
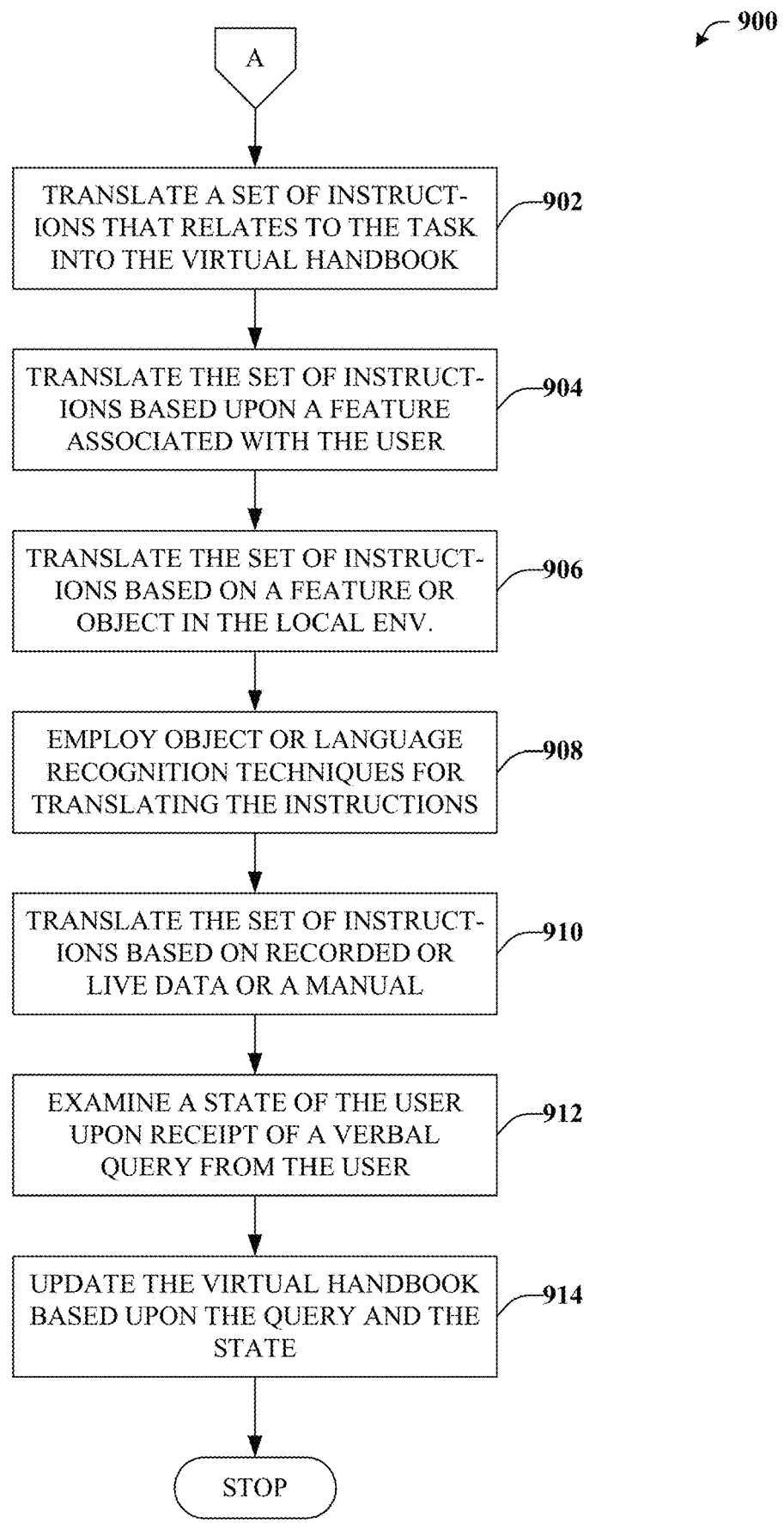
FIG. 9 depicts an exemplary flow chart of procedures defining a method for constructing the dynamic virtual handbook based upon one or more translation techniques.

FIGS. 7, 8, and 9 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 7, exemplary computer implemented method 700 for presenting a second-person avatar for facilitating manual illustration is provided. Generally, at reference numeral 702, a projector included in a user-interface can be employed for displaying at least a portion of a second-person avatar. The second-person avatar can be displayed in a region of space that substantially envelopes at least a portion of a target user, or that appears to envelope the target user. Thus, the second-person avatar can be intentionally designed as a second-person device.

Accordingly, at reference numeral 704, a dynamic virtual handbook can be received. The dynamic virtual handbook can include a set of action for the second-person avatar (e.g., avatar actions) for illustrating suggested or recommended actions by the user or operator relating to accomplishing a task in a local setting or environment.

Next to be describe, at reference numeral 706, the user-interface can be employed for updating the second-person avatar based upon the virtual handbook and/or the avatar actions included therein. Thus, when the user emulates the avatar actions (visually performed by the second-person avatar), the user can more proficiently accomplish the desired task by following the visual demonstration of the second-person avatar.

Referring to FIG. 8, exemplary computer implemented method 800 for providing addition features in connection with presenting a second-person avatar for manual illustration is depicted. At reference numeral 802, all or a portion of the user-interface can be included in a headset or wearable device. Appreciably, all or portions of the user-interface can likewise be included in a portable or room-mounted device.

At reference numeral 804, a disparate feature or object in the local environment can be identified. The feature or object can pertain to accomplishing the task desired by the user such as which tool to use, which connector to disconnect next, which screw to tighten first or the like. Appreciable, also at reference numeral 804, the feature or object can be visually highlighted to facilitate ready identification by the user.

In one or more aspects of the claimed subject matter, at reference numeral 806, a deviation can be identified when a user action diverges from an avatar action by or beyond an acceptable tolerance. When such a situation occurs (e.g., the deviation is identified), then at reference numeral 808, a deviation grid can be created for mapping a region of the avatar that diverges from an associated portion of the user. Also at reference numeral 808, a color of the region of the avatar can be changed (e.g., to red) based upon the deviation grid to alert the user in a visual manner as to the deviation. It should be understood that the acceptable tolerance can be vary depending upon the particular application or task, and can be set by the user, according to a default, dynamically determined or inferred, or various combinations thereof.

Furthermore, at reference numeral 810, a speech report can be created for explaining the deviation or a corrective process thereof in verbal form. Once created, the speech report can be output to the user in an audible fashion to supplement the avatar actions or to provide context or additional information. For example, the speech report can provide background information about the task while the second-person avatar executes avatar actions included in the virtual handbook. Likewise, the speech report can suggest the user pick up a different tool or the like.

With reference now to FIG. 9, method 900 for constructing the dynamic virtual handbook based upon one or more translation techniques is illustrated. At reference numeral 902, a set of instructions that relates to accomplishing the task can be translated into the dynamic virtual handbook. At reference numeral 904, the set of instructions can be translated based upon a feature associated with the user or a corresponding user profile. For example, based upon set of instructions, the handbook can be generated in connection with various aspects, proficiencies, or limitations of the user or of the user's local environment.

Similarly, at reference numeral 906, the set of instructions can be translated based upon a feature or object (or lack thereof) associated with the local environment. For instance, if the local environment includes features or objects that can be efficiently leveraged, or based upon the size of the local environment, or substantially any suitable factor, these aspects can be accounted for when constructing the virtual handbook.

At reference numeral 908, one or more of object recognition techniques or language recognition techniques can be employed for translating the set of instructions. For example, language recognition can be utilized for interpreting a manual or verbal commands, comments, or requests. Language recognition can also be employed for translating from one language to another. Moreover, object recognition can be employed for interpreting diagrams or the like from a manual or another instruction set. Object recognition can further be utilized to assess the local environment such as in connection with reference numeral 906.

Furthermore, at reference numeral 910, the set of instructions can be translated based upon at least one of a live or recorded manual demonstration of accomplishing the task in a remote environment. At reference numeral 910, the set of instructions can also be translated based upon live or recorded verbal instructions; or based upon an instruction manual or guide, potentially one that is located in the local environment or retrieved from an online or network source.

In one or more aspects of the claimed subject matter, at reference numeral 912, a state of the user can be examined upon receipt of a verbal query from the user. For instance, the state of the user (e.g., current activity or configuration or the like) can be captured when the user asks, "Is this correct?" (e.g., performs the query). Accordingly, at reference numeral 914, the virtual handbook can be updated based upon the query and the state. Hence, upon update to the virtual handbook, the second-person avatar or a suitable voice-over can reply to the query.

Figure 10:
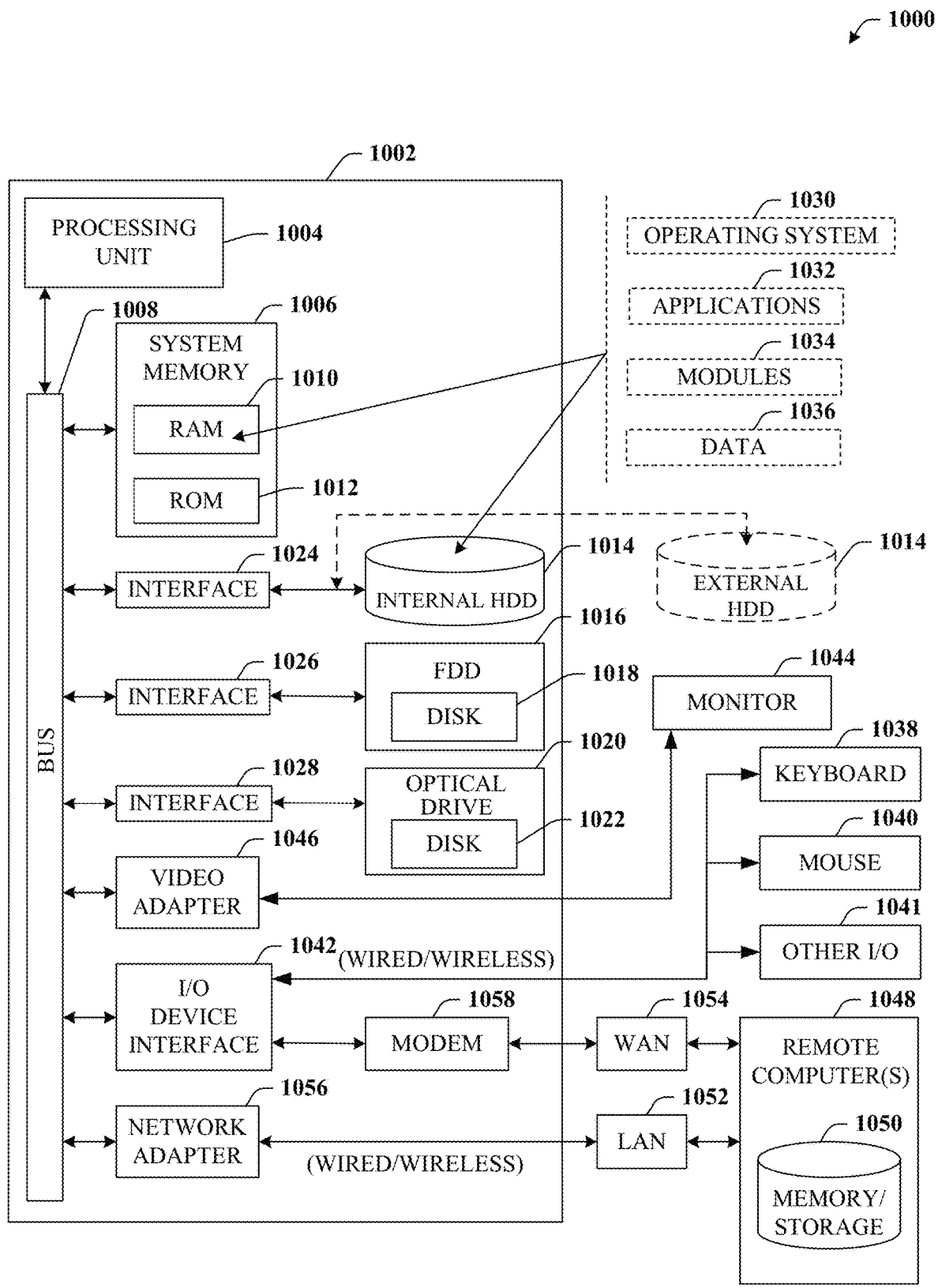
FIG. 10 illustrates a block diagram of a computer operable to execute the disclosed architecture.

Referring now to FIG. 10, there is illustrated a block diagram of an exemplary computer system operable to execute the disclosed architecture. In order to provide additional context for various aspects of the claimed subject matter, FIG. 10 and the following discussion are intended to provide a brief, general description of a suitable computing environment 1000 in which the various aspects of the claimed subject matter can be implemented. Additionally, while the claimed subject matter described above may be suitable for application in the general context of computer-executable instructions that may run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, handheld computing devices, microprocessor-based or programmable consumer electronics, and the like, each of which can be operatively coupled to one or more associated devices.

The illustrated aspects of the claimed subject matter may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media can include both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects of the claimed subject matter includes a computer 1002, the computer 1002 including a processing unit 1004, a system memory 1006 and a system bus 1008. The system bus 1008 couples to system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE1394 interface technologies. Other external drive connection technologies are within contemplation of the subject matter claimed herein.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods of the claimed subject matter.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the claimed subject matter can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices 1041 may include a speaker, a microphone, a camera or another imaging device, an IR remote control, a joystick, a game pad, a stylus pen, touch screen, or the like. These and other input devices are often connected to the processing unit 1004 through an input-output device interface 1042 that can be coupled to the system bus 1008, but can be connected by other interfaces, such as a parallel port, an IEEE1394 serial port, a game port, a USB port, an IR interface, etc.

A monitor 1044 or other type of display device is also connected to the system bus 1008 via an interface, such as a video adapter 1046. In addition to the monitor 1044, a computer typically includes other peripheral output devices (not shown), such as speakers, printers, etc.

The computer 1002 may operate in a networked environment using logical connections via wired and/or wireless communications to one or more remote computers, such as a remote computer(s) 1048. The remote computer(s) 1048 can be a workstation, a server computer, a router, a personal computer, a mobile device, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 via the interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 5 GHz radio bands, at an 10 Mbps (802.11b) or 54 Mbps (802.11a) data rate, for example, or with products that contain both bands (dual band), so the networks can provide real-world performance similar to the basic "10BaseT" wired Ethernet networks used in many offices.

Figure 11:
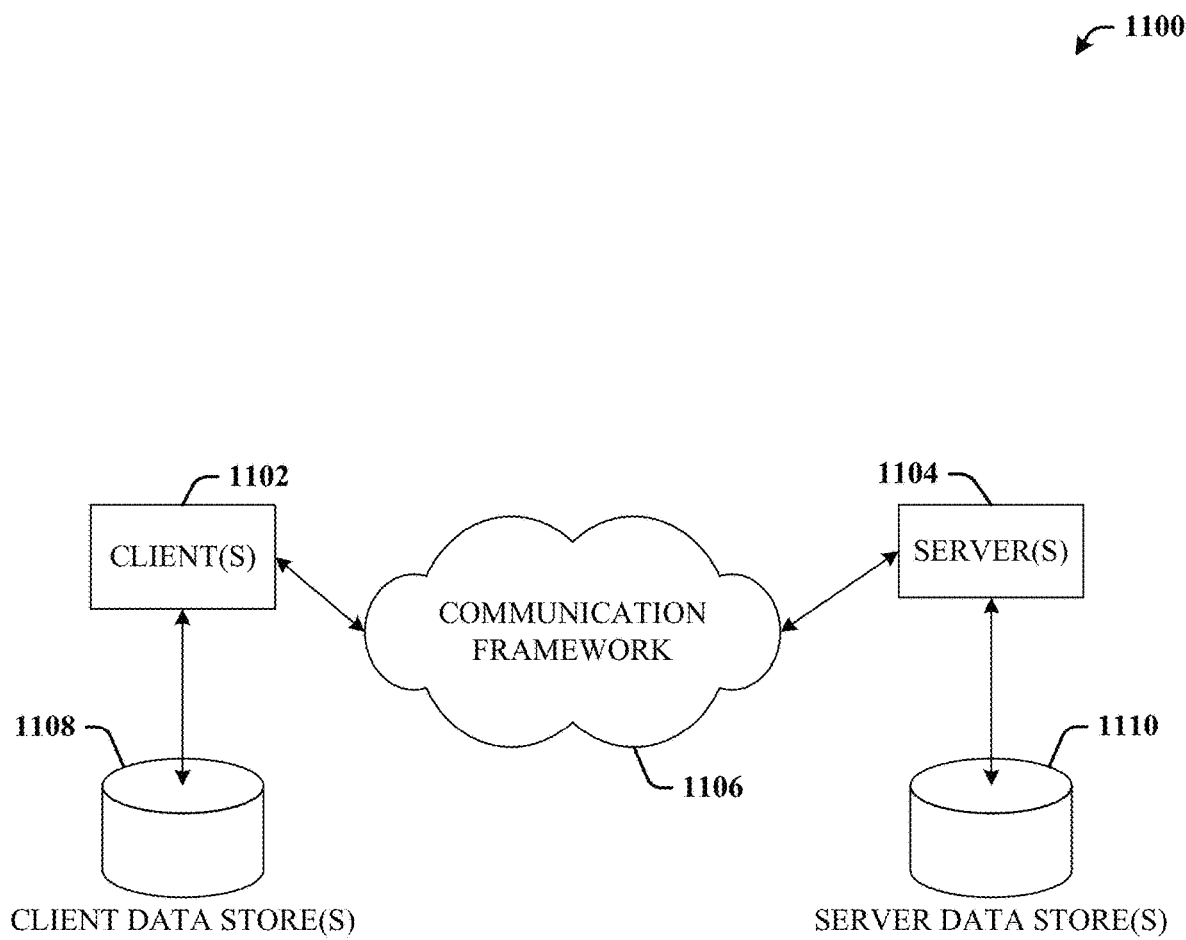
FIG. 11 illustrates a schematic block diagram of an exemplary computing environment.

Referring now to FIG. 11, there is illustrated a schematic block diagram of an exemplary computer compilation system operable to execute the disclosed architecture. The system 1100 includes one or more client(s) 1102. The client(s) 1102 can be hardware and/or software (e.g., threads, processes, computing devices). The client(s) 1102 can house cookie(s) and/or associated contextual information by employing the claimed subject matter, for example.

The system 1100 also includes one or more server(s) 1104. The server(s) 1104 can also be hardware and/or software (e.g., threads, processes, computing devices). The servers 1104 can house threads to perform transformations by employing the claimed subject matter, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated via a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various embodiments. It is, of course, not possible to describe every conceivable combination of components or methodologies for purposes of describing the embodiments, but one of ordinary skill in the art may recognize that many further combinations and permutations are possible. Accordingly, the detailed description is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the embodiments. In this regard, it will also be recognized that the embodiments includes a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A method for presenting a second-person avatar for facilitating manual illustration, comprising:
   identifying a target user and a physical object in an image of a local, real-world environment that includes the target user and the physical object;
   employing a projector included in a user-interface displaying at least a portion of the second-person avatar which, from a perspective of the target user, appears to encapsulate at least a portion of the target user in a volume of physical space in the local, real-world environment;
   receiving a dynamic virtual handbook including a set of avatar actions, comprising one or more instructions, for the second-person avatar to illustrate suggested user actions relating to accomplishing a task utilizing the physical object to accomplish the task in the local, real-world environment when emulated by the target user;
   tailoring at least one avatar action of the set of avatar actions based on an inference made from a second user historically completing the at least one avatar action by emulating movements of the second-person avatar; and
   updating the second-person avatar based upon the dynamic virtual handbook.

2. The method of claim 1, further comprising at least one of:
   translating a set of instructions that relates to accomplishing the task into the dynamic virtual handbook;
   translating the set of instructions based upon a feature associated with the target user or a profile thereof;
   translating the set of instructions based upon a feature or object associated with the local, real-world environment;
   employing at least one of object recognition techniques or language recognition techniques for translating the set of instructions;
   translating the set of instructions based upon at least one of a live or recorded manual demonstration of accomplishing the task in a remote environment, based upon live or recorded verbal instructions, or based upon an instruction manual or guide;
   examining a state of the target user upon receipt of a verbal query from the target user; and
   updating the dynamic virtual handbook based upon the verbal query and the state.

3. The method of claim 1, wherein the user-interface further includes at least one of a camera, a speaker, a display, a keyboard, a network adapter, a microphone, an accelerometer, a biometric sensor, and a gaze-tracking sensor.

4. The method of claim 1, wherein the second-person avatar is visible when viewed through a head up display or a virtual retinal display included in the user-interface.

5. The method of claim 1, wherein the dynamic virtual handbook identifies a disparate, physical feature or object included in the local, real-world environment that pertains to accomplishing the task; and the user-interface visually highlights the physical feature or object.

6. The method of claim 1, further comprising determining a deviation when a user action or configuration deviates from an avatar action beyond an error threshold.

7. The method of claim 6, further comprising constructing a deviation grid that identifies a section of the second-person avatar that deviates from an associated portion of the target user; and the user-interface updates a color of the section of the second-person avatar based upon the deviation grid.

8. The method of claim 6, further comprising constructing a speech report that explains the deviation or a corrective process thereof in verbal form, wherein the user-interface outputs the speech report.

9. A computer implemented system that provides a second-person avatar in order to facilitate manual instruction, comprising:
   a user-interface component that includes a projector that displays at least a portion of the second-person avatar which, from a perspective of a target user, appears to encapsulate at least a portion of the target user in a volume of physical space in a local, real-world environment of the target user;
   one or more processors; and
   one or more memory devices storing computer-usable instructions which, when executed by the one or more processors, implement:
   an interpretation component that translates a set of text-based instructions for performing a task into avatar actions for the second-person avatar to perform the task and determines to have the second-person avatar perform at least one avatar action at an inferred speed;
   an intelligence component that determines the inferred speed as a probabilistic inference based on at least one of a physical feature identified in the target user, a target user history, and a monitored proficiency of the target user;
   an illustration component that receives the avatar actions, and illustrates the second-person avatar performing the avatar actions with the at least one avatar action performed at the inferred speed;
   wherein the illustration component identifies a deviation when a user action or configuration deviates from the avatar actions beyond an error threshold,
   wherein the illustration component constructs a deviation grid that identifies a section of the second-person avatar that deviates from an associated portion of the target user, and
   wherein the user-interface component updates a color of the section of the second-person avatar based upon the deviation grid.

10. The system of claim 9, wherein the user-interface component is included in a headset or wearable unit.

11. The system of claim 9, wherein the second-person avatar is visible when viewed through a head up display or a virtual retinal display included in the user-interface component.

12. The system of claim 9, wherein the illustration component constructs a speech report that explains the deviation or a corrective process thereof in verbal form; and the user-interface outputs the speech report.

13. The system of claim 9, further comprising identifying a disparate feature or object in the local, real-world environment pertaining to accomplishing the task and visually highlighting the disparate feature or object.

14. One or more hardware memory devices having embodied thereon computer-usable instructions which, when executed by one or more processing devices, facilitate a method of presenting a second-person avatar that provides a visual demonstration for emulation by a target user to accomplish a task in a local, real-world environment, the method comprising:

identifying the target user in an image of the local, real-world environment that includes the target user;

causing to be displayed a portion of the second-person avatar which, from a perspective of the target user, appears to envelope a portion of the target user in a volume of physical space in the local, real-world environment;

receiving a dynamic virtual handbook including a set of avatar actions, comprising one or more instructions for updating the second-person avatar to perform one or more avatar actions that accomplish the task when emulated by the target user;

updating the second-person avatar based upon the dynamic virtual handbook, such that the displayed portion of the second-person avatar performs the one or more avatar actions that accomplish the task, thereby providing the visual demonstration for emulation by the target user to accomplish the task in the local, real-world environment;

identifying a deviation when a user action or configuration deviates from the one or more avatar actions beyond an error threshold;

constructing a deviation grid that identifies a section of the second-person avatar that deviates from an associated portion of the target user; and updating a color of the section of the second-person avatar based upon the deviation grid.

15. The one or more hardware memory devices of claim 14, the method further comprising:

identifying a physical object in the image of the local, real-world environment that includes the target user and the physical object;

wherein the task utilizes the physical object; and wherein the displayed portion of the second-person avatar performs the one or more avatar actions that accomplish the task utilizing the physical object.

16. The one or more hardware memory devices of claim 14, wherein the second-person avatar is visible when viewed through a head up display or a virtual retinal display.

17. The one or more hardware memory devices of claim 14, the method further comprising translating a set of instructions that relates to accomplishing the task into the dynamic virtual handbook.

18. The one or more hardware memory devices of claim 17, the method further comprising translating the set of instructions based upon a feature associated with the target user or a profile thereof.

19. The one or more hardware memory devices of claim 17, the method further comprising translating the set of instructions based upon a feature or object associated with the local, real-world environment.

20. The one or more hardware memory devices of claim 17, the method further comprising translating the set of instructions based upon at least one of a live or recorded manual demonstration of accomplishing the task in a remote environment, based upon live or recorded verbal instructions, or based upon an instruction manual or guide.

* * * * *